US011502631B2

United States Patent
Yu et al.

(10) Patent No.: US 11,502,631 B2
(45) Date of Patent: Nov. 15, 2022

(54) VECTOR FLUX WEAKENING CONTROL SYSTEM FOR PERMANENT MAGNET SYNCHRONOUS MOTOR OF ELECTRIC DRIVE SYSTEM

(71) Applicant: ZHEJIANG UNIVERSITY, Hangzhou (CN)

(72) Inventors: Miao Yu, Hangzhou (CN); Lingxia Lu, Hangzhou (CN); Donglian Qi, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/348,772

(22) Filed: Jun. 16, 2021

(65) Prior Publication Data

US 2022/0014132 A1 Jan. 13, 2022

Related U.S. Application Data

(63) Continuation of application No. PCT/CN2020/100989, filed on Jul. 9, 2020.

(51) Int. Cl.
 *H02P 5/74* (2006.01)
 *H02P 21/00* (2016.01)
 *H02P 21/22* (2016.01)

(52) U.S. Cl.
 CPC .......... *H02P 21/0089* (2013.01); *H02P 21/22* (2016.02); *H02P 2207/05* (2013.01)

(58) Field of Classification Search
 CPC ...... B60L 15/025; H02P 5/74; H02P 21/0089; H02P 21/22; H02P 2207/05
 See application file for complete search history.

(56) References Cited

U.S. PATENT DOCUMENTS

| 2005/0212471 A1 | 9/2005 | Patel et al. | |
|---|---|---|---|
| 2010/0066283 A1* | 3/2010 | Kitanaka | B60L 15/025 318/400.02 |
| 2010/0301787 A1* | 12/2010 | Gallegos-Lopez | H02P 5/74 180/65.285 |

FOREIGN PATENT DOCUMENTS

| CN | 1797928 A | 7/2006 |
|---|---|---|
| CN | 107592047 A | 1/2018 |

(Continued)

OTHER PUBLICATIONS

International Search Report (PCT/CN2020/100989); dated Apr. 8, 2021.

*Primary Examiner* — Cortez M Cook
(74) *Attorney, Agent, or Firm* — W&G Law Group

(57) ABSTRACT

The present disclosure disclose a vector flux weakening control system for a permanent magnet synchronous motor of an electric drive system, which includes a current closed-loop regulation module, a modulation index deviation calculation module, a current characteristic point setting module, a current compensation vector angle calculation module, a current compensation vector amplitude calculation module, a current compensation vector calculation module and a current instruction correction module. In the present disclosure, the three-phase short-circuit current of the motor is taken as the end point of flux weakening regulation, and when voltage saturation occurs, the motor control system can exit saturation; since an inverter supplies power through a power battery bus at the terminal of the motor, the terminal voltage thereof will not be as low as zero, and there is a large margin to deal with abnormal factors; by introducing a dq current and correcting it at the same time, the pressure of resisting voltage saturation can be distributed to the dq current, thus avoiding excessive deviation of an output torque caused by excessive uniaxial current regulation.

(Continued)

According to the present disclosure, the influence of the flux weakening control process on the output torque of the drive system is reduced as much as possible while ensuring the safety of the drive system.

1 Claim, 2 Drawing Sheets

(56) References Cited

FOREIGN PATENT DOCUMENTS

| CN | 109150042 A | 1/2019 |
| CN | 111277182 A | 6/2020 |

\* cited by examiner

VECTOR FLUX WEAKENING CONTROL SYSTEM FOR PERMANENT MAGNET SYNCHRONOUS MOTOR OF ELECTRIC DRIVE SYSTEM

TECHNICAL FIELD

The present disclosure belongs to the field of permanent magnet synchronous motor control, and particularly relates to a vector flux weakening control system for a permanent magnet synchronous motor of an electric drive system.

BACKGROUND

In the control system of an interior permanent magnet synchronous motor (IPMSM) for vehicles, because the controlled object-IPMSM inevitably changes in the practical application scene, the pre-solidified control parameters in the control program fail, which leads to the voltage saturation caused by the lack of flux weakening in the high-speed operation of the motor, endangering the stability of the motor drive system.

The IPMSM has the characteristics of a high power density, a wide operating range and a high efficiency, so it is widely used in the drive motor of an electric vehicles, and its torque equation is:

$$T_e = 1.5 P_n (\varphi_f i_q + (L_d - L_q) i_d i_q) \quad (1)$$

in which, $T_e$ is an electromagnetic torque of the motor; $P_n$ is the number of poles of the motor; $\varphi_f$ is the flux of a rotor permanent magnet; $i_q$ is a q-axis current and $i_d$ is a d-axis current. $L_d$ is a d-axis inductance; $L_q$ is a q-axis inductance; in the normal driving process of the IPMSM, $T_e > 0$, $i_q > 0$, $i_d > 0$, and $L_d < L_q$.

It can be seen from the above equation that the torque is positively correlated with the current, but different dq axis current combinations will correspond to different torques, and there will be a set of specific dq current combinations under each fixed current amplitude, so that the motor can output the maximum torque under this current. Due to the saturation of the magnetic field, the dq-axis inductances $L_d$ and $L_q$ change with the change of the current when the current is larger than a certain range, and the maximum range of the change can reach as much as 200%. The change of these parameters makes it very difficult or even impossible to solve the optimal dq current combination under each current on line. Therefore, in vehicle motor control, the optimal current combination corresponding to each torque is generally obtained through experimental test and calibration. The line connected by all such current combinations in the full torque range is called the maximum torque per ampere (MTPA) curve of the IPMSM.

In addition, the operation of the IPMSM for vehicles relies on the inverter to convert the bus of the power battery into a three-phase alternating current, which means that the terminal voltage of the motor is constrained by the DC bus; the voltage equation of the IPMSM is:

$$V_d = i_d R_s + L_d \frac{di_d}{dt} - \omega L_q i_q \quad (2)$$
$$V_q = i_q R_s + L_q \frac{di_q}{dt} + \omega(\varphi_f + L_d i_d)$$

in which, $V_d$ is a d-axis voltage of the motor and $V_q$ is a q-axis voltage of the motor; $R_s$ is a stator resistance and $\omega$ is an electrical angular velocity of the motor; at a high-speed and steady state, the amplitude of the terminal voltage $V_s$ of the motor is approximately as below:

$$|V_s| = \omega \sqrt{(L_q i_q)^2 + (\varphi_f + L_d i_d)^2} \quad (3);$$

the terminal voltage of the motor rises as the speed of the motor rises; when the terminal voltage of the motor exceeds the AC voltage amplitude that can be provided by a bus voltage, it is necessary to carry out flux weakening control, and the maximum AC voltage that can be provided by the bus at present is the voltage limit $V_{s\_lmt}$, the expression of which is generally as follows:

$$V_{s\_lmt} = V_{dc} \cdot MI_{max}/\sqrt{3}$$

in which, $V_{dc}$ is the bus voltage, and $MI_{max}$ is the maximum modulation index of the motor control system, and its value is generally around 1, with a maximum of 1.1027.

In order to obtain the current combination that can satisfy both the torque equation and the voltage limit, the dq current combination corresponding to each torque under different buses and rotating speeds is still calibrated and obtained by experimental means; afterwards, these data are filled into tables and stored in a digital control chip. When the motor runs in real time, the torque instructions at different speeds and bus voltages are converted into corresponding dq current instructions by looking up the tables.

The premise that the above process can work normally is that the current combination obtained by calibrating the prototype experiment can be applied to each motor of the same type; however, in practical applications, the following aspects will cause this assumption to become not tenable:

1. The processes and materials will inevitably lead to the inconsistency of motors in batch production;
2. The deviation of the rotational deformation offset of the motor will lead to the deviation of the magnetic field orientation in terms of control, which will lead to the inconsistency between an actual dq current in the motor and an expected current instruction, even if the current regulator works normally;
3. The change of the ambient temperature will affect the flux linkage of a permanent magnet. When the temperature decreases, $\varphi_f$ will increase, leading to the result that the dq current instruction obtained by calibration does not satisfy the voltage limit any more.

Therefore, in order to enhance the robustness of the high-speed operation area of the electric drive control system, the flux weakening control process is usually added.

To solve the problem of flux weakening in motor control, the invention patent CN101855825B puts forward a representative solution, that is, according to the difference between a voltage output by the current regulator and a voltage limit, a voltage deviation is obtained, and $I_d$ current correction obtained from the deviation through a proportional-integral (PI) process is superimposed on a D-axis current; the upper limit of the correction is limited to 0, thus deepening the flux weakening and achieving the purpose of flux weakening control, as shown in FIG. 1. According to the equation (3), when $(\varphi_f + L_d i_d) > 0$, increasing the $i_d$ in the negative direction can reduce the output voltage, that is, this solution is effective. However, when $(\varphi_f + L_d i_d) < 0$, continuing to increase the $i_d$ in the negative direction will increase $V_q$ in a reverse direction, which will cause voltage saturation to become more severe. Therefore, when using this method, $(\varphi_f + L_d i_d) > 0$ must be guaranteed; however, in the control of a vehicle motor, if this restriction is added, the reluctance torque of the motor in the high-speed region will not be fully utilized, thus sacrificing the performance of the motor.

Adopting the method of reducing $i_d$ when the voltage is saturated in the above solution can deepen the flux weakening and make the motor exit the voltage saturation state, but this method has a great influence on the output torque, because only by correcting $i_d$, a large $i_d$ correction amount is needed, and dq current combination changes greatly, which has a great influence on the output torque. The literature (T. M. Jahns, "Flux Weakening Regime Operation of an Interior Permanent-Magnet Synchronous Motor Drive", IEEE Trans. on Ind. Appl., vol. IA-23, no. 4, pp. 55-63, 1987) put forward a method to reduce $i_q$ in the flux weakening; however, only adjusting a single current also faces the problem of exerting a great impact on the output torque as mentioned in 2; there still lacks good existing technologies that can not only effectively deal with the voltage saturation problem, but also affect the output torque as little as possible.

SUMMARY

The purpose of the present disclosure is to provide a vector flux weakening control system for a permanent magnet synchronous motor of an electric drive system aiming at the shortcomings of the prior art. In order to enhance the robustness of the high-speed operation area of the electric drive control system, a flux weakening control process is added.

The purpose of the present disclosure is realized by the following technical solution: a vector flux weakening control system for a permanent magnet synchronous motor of an electric drive system, including a current closed-loop regulation module, a modulation index deviation calculation module, a current characteristic point setting module, a current compensation vector angle calculation module, a current compensation vector amplitude calculation module, a current compensation vector calculation module and a current instruction correction module, the current closed-loop regulation module is configured to transmit dq current instructions $\hat{i}_{dref}$ and $\hat{i}_{qref}$ corrected by the current instruction correction module to a proportional-integral controller to obtain dq voltage instructions $v_{dref}$ and $v_{qref}$;

the modulation index deviation calculation module is configured to process the dq voltage instructions $v_{dref}$ and $v_{qref}$ output by the current closed-loop regulation module to obtain a desired modulation index $MI_{ref}$:

$$MI_{ref} = \frac{\sqrt{3(v_{dref}^2 + v_{qref}^2)}}{V_{dc}}$$

where $V_{dc}$ is a bus voltage; then a difference between a maximum modulation index $MI_{max}$ of a motor control system and the desired modulation index $MI_{ref}$ is calculated to obtain $\Delta MI_0$, and finally a modulation index deviation $\Delta MI$ is obtained through a low-pass filter, the current characteristic point setting module is configured to set a d-axis bus current $i_{d\_sc}$ when a three-phase terminal of the motor is short-circuited:

$$i_{d\_sc} = -\frac{\varphi_f}{L_d}$$

where $\varphi_f$ is a flux of a rotor permanent magnet and $L_d$ is a d-axis inductance, the current compensation vector amplitude calculation module is configured to take the output modulation index deviation $\Delta MI$ of the modulation index deviation calculation module as an input, and perform proportional-integral regulation to obtain a current vector compensation amplitude $|\Delta i|$:

$$|\Delta i| = \frac{k_p s + k_i}{s} \Delta MI,$$

where $k_p$ is a proportional coefficient of the proportional-integral controller and $k_i$ is an integral coefficient of the proportional-integral controller;

the current compensation vector angle calculation module is configured to calculate a current compensation vector angle $\theta$ from a current operating point $(i_{dref}, i_{qref})$ to $(i_{d\_sc}, 0)$:

$$\theta = \cos^{-1}\left(\frac{-i_{dref} i_{d\_sc}}{i_{d\_sc}\sqrt{i_{dref}^2 + i_{qref}^2}}\right),$$

the current compensation vector calculation module is configured to calculate dq axis compensation components $\Delta i_{dref}$ and $\Delta i_{dref}$ according to the current vector compensation amplitude $|\Delta i|$ output by the current compensation vector amplitude calculation module and the current compensation vector angle $\theta$ output by the current compensation vector angle calculation module:

$$\Delta i_{qref} = -|\Delta i| \sin \theta$$

$$\Delta i_{dref} = |\Delta i| \cos \theta,$$

the current instruction correction module superimposes the output $\Delta i_{dref}$ and $\Delta i_{dre}$ of the current compensation vector calculation module with original dq current instructions $i_{dref}$ and $i_{dref}$ to obtain corrected dq current instructions $\hat{i}_{dref}$ and $\hat{i}_{qref}$:

$$\hat{i}_{dref} = i_{dref} + \Delta i_{dref}$$

$$\hat{i}_{qref} = i_{qref} + \Delta i_{qref}$$

The present disclosure has the following beneficial effects: the terminal short-circuit protection system of a vehicle permanent magnet synchronous motor based on voltage feedforward reduces the influence of the flux weakening control process on the output torque of the drive system as much as possible in the meanwhile of ensuring the safety of the drive system. Specifically:

1. Taking the three-phase short-circuit current of the motor as the end point of flux weakening regulation, no matter where the current motor is running, it is no longer limited by the limitation of $(\varphi_f + L_d i_d) > 0$ in the prior art, and the motor control system can exit saturation when voltage saturation occurs;

2. Taking the three-phase short-circuit current of the motor as the end point of flux weakening regulation, the output voltage at this point is zero under ideal conditions, which is the limit point of flux weakening operation of the motor; in fact, the voltage at the terminal of the motor will not be as low as zero because the inverter supplies power through the power battery bus, so there is a large margin in the present disclosure, which can be used to deal with abnormal factors, such as the flux linkage change of the motor rotor and the deviation of the rotational deformation offset, that will lead to voltage saturation at a high speed;

3. By introducing dq current and correcting it at the same time, the pressure of resisting voltage saturation can be shared to the dq current, thus avoiding excessive deviation of the output torque caused by excessive uniaxial current regulation.

DESCRIPTION OF EMBODIMENTS

Figure 1:
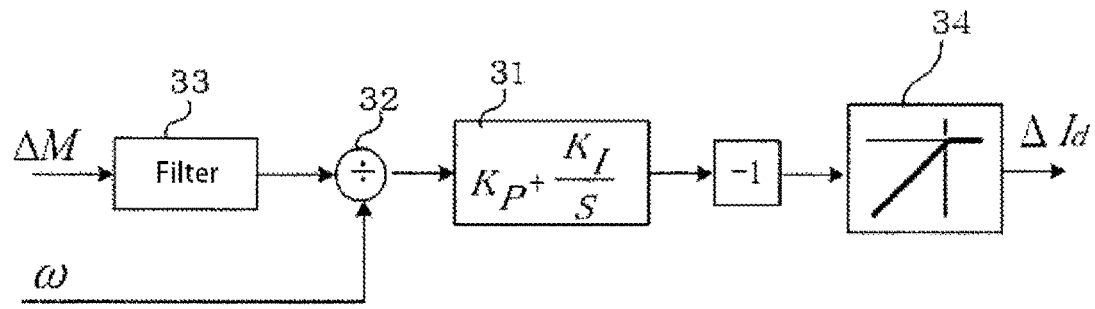
FIG. 1 is a schematic diagram of a flux weakening control system in the prior art.
Figure 2:
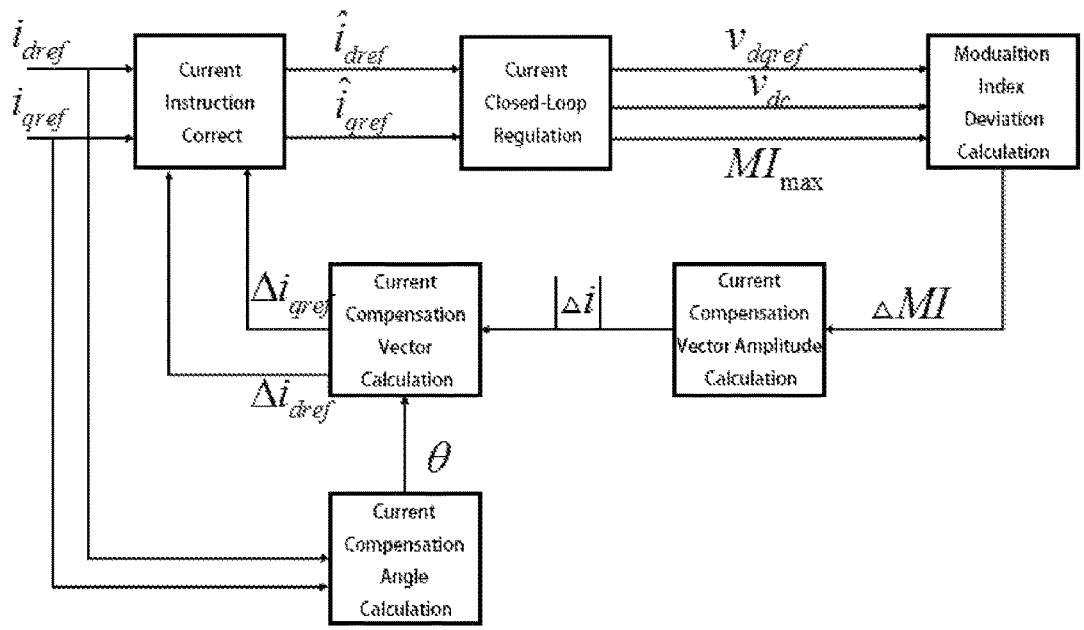
FIG. 2 is a block diagram of the overall topological structure of a flux weakening system of the present disclosure.

As shown in FIG. 2, the vector flux weakening control system for a permanent magnet synchronous motor in an electric drive system of the present disclosure includes a current closed-loop regulation module, a modulation index deviation calculation module, a current characteristic point setting module, a current compensation vector angle calculation module, a current compensation vector amplitude calculation module, a current compensation vector calculation module and a current instruction correction module; specifically:

(1) The current closed-loop regulation module transmits the dq current instructions $\hat{i}_{dref}$ and $\hat{i}_{qref}$ corrected by the current instruction correction module to the PI controller to obtain dq voltage instructions $v_{dref}$ and $v_{dref}$.

$$v_{dref} = \frac{K_{pd}s + K_{id}}{s}(\hat{i}_{dref} - i_d)$$

$$v_{qref} = \frac{K_{pq}s + K_{iq}}{s}(\hat{i}_{qref} - i_q)$$

in which, $K_{pd}$ and $K_{pq}$ are d-axis proportional coefficient and q-axis proportional coefficient of the PI controller respectively, $K_{id}$ and $K_{iq}$ are d-axis integral coefficient and q-axis integral coefficient of the PI controller respectively, and $i_d$ and $i_q$ are dq-axis feedback currents collected in real time during the operation of the PI controller.

Figure 3:
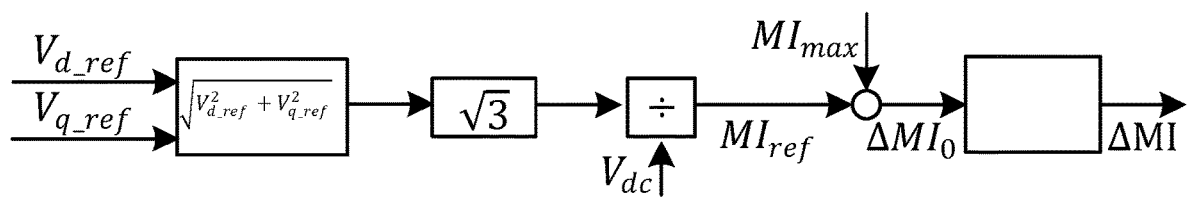
FIG. 3 is a schematic diagram of the process of modulation index deviation calculation.

(2) As shown in FIG. 3, the modulation index deviation calculation module calculates a sum of squares of the dq voltage instructions $v_{dref}$ and $v_{dref}$ output by the current closed-loop regulation module, and then extracts a root, which is multiplied by $\sqrt{3}$ and divided by the bus $V_{dc}$ to obtain the desired modulation index $MI_{ref}$:

$$MI_{ref} = \frac{\sqrt{3(v_{dref}^2 + v_{qref}^2)}}{V_{dc}};$$

A difference between the maximum modulation index $MI_{max}$ of the motor control system and the expected modulation index $MI_{ref}$ is calculated, wherein $MI_{max}$ can be set and its theoretical limit is 0.635; $\Delta MI_0 = MI_{ref} - MI_{max}$ is made to pass through a low-pass filter (LPF) to obtain a modulation index deviation $\Delta MI$, wherein the function of the low-pass filter is to remove the high-frequency noise in a dq current regulator, so that the output flux weakening control system smoothly outputs a current correction, thus preventing great fluctuation of the motor torque.

(3) The current characteristic point setting module: $i_{d\_sc}$ is a d-axis bus current when the three-phase terminal of the motor is short-circuited, and the output voltage of the motor at this moment is 0, which is the flux weakening limit point of the motor, the theoretical value of which is:

$$i_{d\_sc} = -\frac{\varphi_f}{L_d},$$

in which $\varphi_f$ is the flux of a rotor permanent magnet and $L_d$ is a d-axis inductance. Because of the saturation effect, $i_{d\_sc}$ will change due to the change of the d-axis inductance, but in the high-speed operation area of the motor, $i_{d\_sc}$ is basically a fixed value in a steady state; it should be pointed out that $i_{d\_sc}$ may be larger than the maximum current allowed by the motor drive system, and the scenario used in this application is that the short-circuit current is smaller than the maximum current, which is also a common feature of the high-speed IPMSM motor for vehicles.

Figure 4:
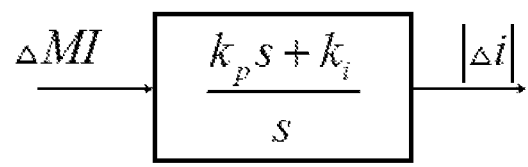
FIG. 4 is a schematic diagram of current compensation vector angle transformation.

(4) As shown in FIG. 4, the current compensation vector amplitude calculation module takes the modulation index deviation $\Delta MI$ as an input, and adjusts the following PI regulation to obtain the current vector compensation amplitude $|\Delta i|$:

$$|\Delta i| = \frac{k_p s + k_i}{s} \Delta MI$$

in which $k_p$ is a proportional coefficient of the PI controller and $k_i$ is an integral coefficient of the PI controller.

Figure 5:
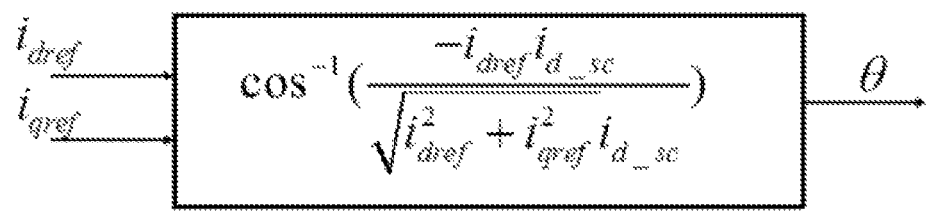
FIG. 5 is a schematic diagram of current compensation vector amplitude transformation.

(5) As shown in FIG. 5, the current compensation vector angle calculation module calculates the current compensation vector angle $\theta$ from current operating point $(i_{dref}, i_{qref})$ to $(i_{d\_sc}, 0)$:

$$\theta = \cos^{-1}\left(\frac{-i_{dref} i_{d\_sc}}{i_{d\_sc}\sqrt{i_{dref}^2 + i_{qref}^2}}\right).$$

(6) The current compensation vector calculation module calculates dq axis compensation components $\Delta i_{dref}$ and $\Delta i_{dref}$ as follows according to the current vector compensation amplitude $|\Delta i|$ output by the current compensation vector amplitude calculation module and the current compensation vector angle $\theta$ output by the current compensation vector angle calculation module:

$\Delta i_{qref} = -|\Delta i| \sin \theta$ $\Delta i_{dref} = |\Delta i| \cos \theta.$ (7) The current instruction correction module superimposes the output $\Delta i_{dref}$ and $\Delta i_{dre}$ of the current compensation vector calculation module with original dq current instructions $i_{dref}$ and $I_{dref}$ to obtain corrected dq current instructions $\hat{i}_{dref}$ and $\hat{i}_{qref}$:

$$\hat{i}_{dref} = i_{dref} + \Delta i_{dref}$$

$$\hat{i}_{qref} = i_{qref} + \Delta i_{qref}$$

What is claimed is:

1. A vector flux weakening control system for a permanent magnet synchronous motor of an electric drive system, for enhancing the robustness of the high-speed operation area of the electric drive control system, comprising a current closed-loop regulation processor, a modulation index deviation calculation processor, a current characteristic point setting processor, a current compensation vector angle calculation processor, a current compensation vector amplitude calculation processor, a current compensation vector calculation processor and a current instruction correction processor, wherein the current closed-loop regulation processor is configured to transmit dq current instructions $\hat{i}_{dref}$ and $\hat{i}_{qref}$ corrected by the current instruction correction processor to a proportional-integral controller to obtain dq voltage instructions $v_{dref}$ and $V_{dref}$;

the modulation index deviation calculation processor is configured to process the dq voltage instructions $V_{dref}$ and $V_{dref}$ output by the current closed-loop regulation processor to obtain a desired modulation index $MI_{ref}$:

$$MI_{ref} = \frac{\sqrt{3(v_{dref}^2 + v_{qref}^2)}}{V_{dc}},$$

where $V_{dc}$ is a bus voltage;

then a difference between a maximum modulation index $MI_{max}$ of a motor control system and the desired modulation index $MI_{ref}$ is calculated to obtain $\Delta MI_0$, and finally a modulation index deviation $\Delta MI$ is obtained through a low-pass filter, the current characteristic point setting processor is configured to set a d-axis bus current $i_{d\_sc}$ when a three-phase terminal of the motor is short-circuited:

$$i_{d\_sc} = -\frac{\varphi_f}{L_d}$$

where $\varphi_f$ is a flux of a rotor permanent magnet and $L_d$ is a d-axis inductance, the current compensation vector amplitude calculation processor is configured to take the output modulation index deviation $\Delta MI$ of the modulation index deviation calculation processor as an input, and perform proportional-integral regulation to obtain a current vector compensation amplitude $|\Delta i|$:

$$|\Delta i| = \frac{k_p s + k_i}{s} \Delta MI,$$

where $k_p$ is a proportional coefficient of the proportional-integral controller and $k_i$ is an integral coefficient of the proportional-integral controller;

the current compensation vector angle calculation processor is configured to calculate a current compensation vector angle $\theta$ from a current operating point $(i_{dref}, i_{qref})$ to $(i_{d\_sc}, 0)$:

$$\theta = \cos^{-1}\left(\frac{-i_{dref} i_{d\_sc}}{i_{d\_sc}\sqrt{i_{dref}^2 + i_{qref}^2}}\right),$$

the current compensation vector calculation processor is configured to calculate dq axis compensation components $\Delta i_{dref}$ and $\Delta i_{dref}$ according to the current vector compensation amplitude output $|\Delta i|$ by the current compensation vector amplitude calculation processor and the current compensation vector angle $\theta$ output by the current compensation vector angle calculation processor:

$$\Delta i_{qref} = -|\Delta i| \sin \theta$$

$$\Delta i_{dref} = |\Delta i| \cos \theta, \text{ and}$$

the current instruction correction processor is configured to superimpose the output $\Delta i_{dref}$ and $\Delta i_{dre}$ of the current compensation vector calculation processor with original dq current instructions $i_{dref}$ and $i_{dref}$ to obtain corrected dq current instructions $\hat{i}_{dref}$ and $\hat{i}_{qref}$:

$$\hat{i}_{dref} = i_{dref} + \Delta i_{dref}$$

$$\hat{i}_{qref} = i_{qref} + \Delta i_{qref}$$

* * * * *